United States Patent

[11] 3,598,907

[72] Inventors William H. Drinkuth
Hebron;
Edward J. Stephens, Manchester, both of, Conn.
[21] Appl. No. 730,377
[22] Filed May 20, 1968
[45] Patented Aug. 10, 1971
[73] Assignee Emhart Corporation
Bloomfield, Conn.

[54] ARTICLE INSPECTION BY SUCCESSIVELY TELEVISED IMAGES
15 Claims, 4 Drawing Figs.

[52] U.S. Cl. .......... 178/6, 178/DIG. 1
[51] Int. Cl. .......... H04n 7/00, H04n 7/18
[50] Field of Search .......... 178/61; 235/92

[56] References Cited

UNITED STATES PATENTS

| | | | |
|---|---|---|---|
| 2,803,406 | 8/1957 | Nuttal .......... | 178/6 |
| 2,493,543 | 1/1950 | Merchant .......... | 178/6 |
| 2,244,826 | 6/1941 | Cox .......... | 178/6 |
| 3,049,588 | 8/1962 | Barnett .......... | 178/6 |
| 3,216,311 | 11/1965 | Bibbero et al. .......... | 178/6 |

*Primary Examiner*—Richard Murray
*Attorney*—McCormick, Paulding and Huber

ABSTRACT: A liquid-filled transparent container is spun momentarily to cause the liquid therein to swirl, and successive video frames provide voltage analogs through a television camera. A memory device is synchronized with the camera and stores at least one of the voltage analogs so that a comparator can subtract one successive analog signal from another to generate an error signal if foreign particles are present in the swirling liquid.

INVENTORS
WILLIAM H. DRINKUTH
EDWARD J. STEPHENS
BY
McCormick, Paulding & Huber
ATTORNEYS

ARTICLE INSPECTION BY SUCCESSIVELY TELEVISED IMAGES

SUMMARY OF INVENTION

This invention relates to the inspection of articles by electronic means, and deals more particularly with a method and means for comparing successively televised images of an article to distinguish between apparently stationary desirable characteristics of the article and undesirable characteristics which are moving with respect to these stationary characteristics.

A general object of the present invention is to provide an improved method and means for article inspection wherein successive images of the moving article are compared electronically to generate an error signal whenever the difference therebetween does not fall within a predetermined range.

A more specific object of the present invention is to provide a method and means of article inspection by successively televised images wherein the article being inspected is transparent and contains a liquid which is to be inspected for the presence of foreign particles, said container being rotated on its vertical axis to impart a swirling motion to the liquid so that successive images of the article can be electronically subtracted to produce an error signal only if one or more foreign particles are being moved with the swirling liquid.

In the description to follow, the successive video images of the article undergoing inspection are compared electronically to detect foreign particles inside a transparent container, but it should be understood that the invention is not so limited, and that the method and means of the present invention could be readily adapted for use in detecting dimensional differences between successively formed video images of any moving article. For example, the article being inspected might be a container symmetrical about its vertical axis, and by rotating such an article through successive angular positions for scanning as suggested in the description to follow, the outline of the container can be checked for continuity to detect flaws in its surface, or to detect a "leaner" where the container is a glass bottle or jar. Further, in the inspection of glassware articles or other transparent containers, the internal surface of the container can be readily inspected in a similar manner, and this internal surface inspection can be accomplished simultaneously with inspection of the exterior surface without departing from the scope of the present invention.

DETAILED DESCRIPTION

Figure 1:
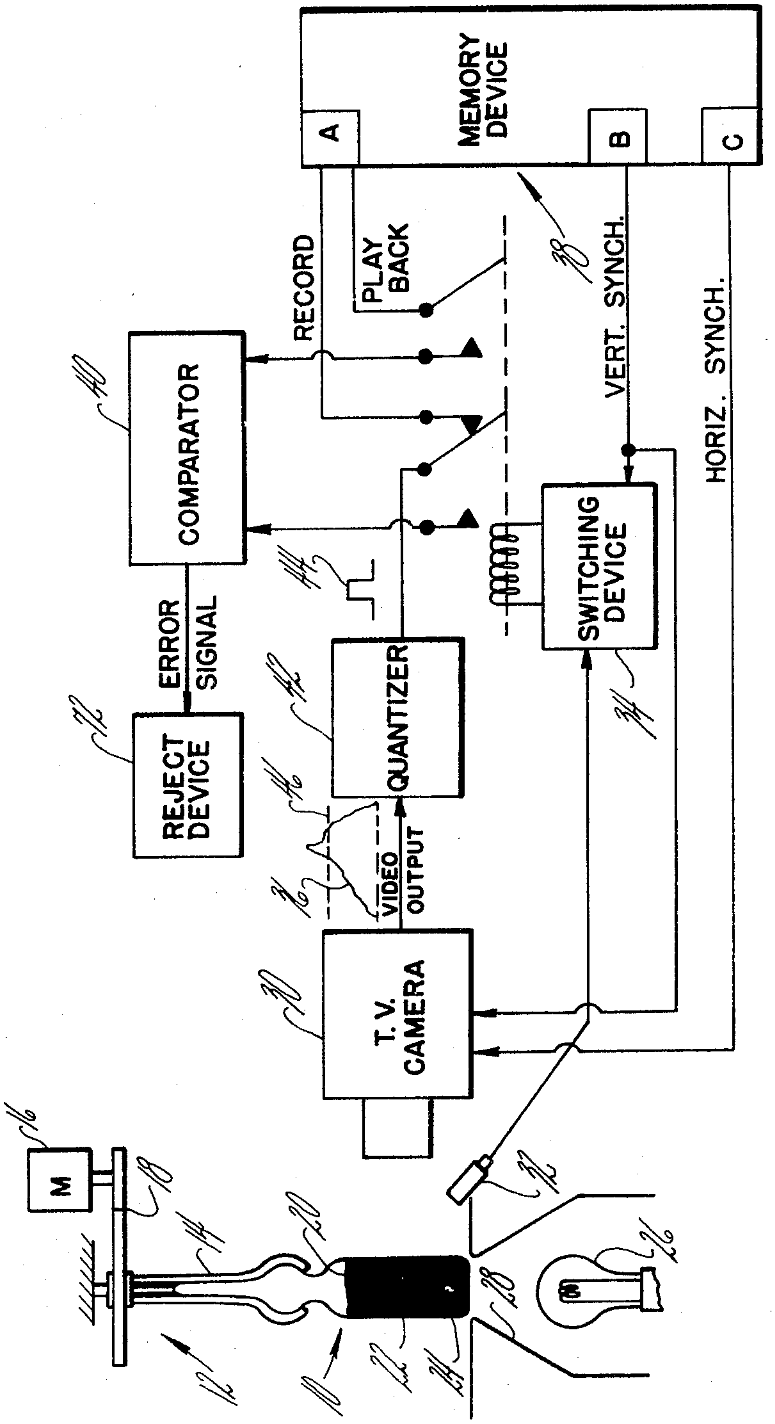
FIG. 1 is a schematic view of a presently preferred embodiment well adapted to carry out one method of the present invention for particulate matter detection in glass ampuls.

Turning now to the drawings in greater detail, FIG. 1 shows an article 10 which has been positioned at an inspection station by suitable article transfer means indicated generally at 12. The transport means 12 includes a chucking device 14 which permits the article or ampul 10 to be spun on its vertical axis at least momentarily by the motor 16 through a driving connection indicated generally at 18. In the illustrated embodiment, the article to be inspected comprises an ampul having a quantity of liquid 20 therein, and in accordance with the present invention this liquid 20 is to be inspected for the presence of foreign particles as for example the particles indicated generally at 22 and 24. The term article as used herein is intended to represent both the container or ampul 10 and its contents, since the latter represents the portion being inspected.

Still with reference to the inspection station, means is provided for illuminating the transparent container from beneath by a lamp 26 which is shielded as indicated generally at 28 so that illumination from said lamp is directed into the container and by internal reflection remains inside the container for achieving optimum illumination of the foreign particles 22 and 24. In this manner, the liquid itself will not be illuminated appreciably, and will thereby present a dark, or black, background for the television camera 30 in order to provide a contrast for the illuminated particles 22 and 24. Still with reference to the inspection station, a photocell or similar device 32 is provided for indicating to the switching device 34 the presence of an article 10 at the inspection station.

The television camera 30 comprises a conventional component of the present system, being adapted to produce a video output as shown with a single horizontal scanline being indicated schematically at 36 to represent the conventional scanning signal produced by the camera 30. In accordance with the present invention, the camera 30 is driven with vertical and horizontal synchronizing pulses from the output of channels B and C of the memory device 38 respectively. This insures that the camera 30 is operating synchronously with the memory device 38 which may comprise a conventional memory disc of the type commonly used with television cameras generally. Thus, a vertical synchronizing pulse is provided to the switching device 34 and to the television camera 30 as indicated in FIG. 1. The channels B and C of the memory device 38 are impressed with vertical and horizontal synchronizing pulses for the camera 30 such that the memory device 38 and the camera 30 always operate in timed or synchronized relationship with one another. The memory device 38 may comprise a disc, a drum, a delay line, a tape, or other well-known electronic memory device.

In accordance with the present invention, means is provided for storing at least one voltage analog signal from the camera 30 in the memory device 38 for later recall in timed relationship with a succeeding voltage analog signal from the camera 30 for comparison in the comparator 40. As indicated schematically in FIG. 1, the video output or voltage analog signal from the camera is reduced by a quantizer 42 to a simple stretched pulse form, as indicated at 44, whenever a particular horizontal scanline, as for example that shown at 36, is provided with a return which exceeds a predetermined voltage level as indicated generally at 46. Thus, whenever a particle above a predetermined size is detected by the camera 30, and more particularly is detected at a particular horizontal scanline of a particular frame thereof, the video output signal will be simplified in the manner indicated by the quantizer 42.

The initial voltage analog signal 44 will be fed to the memory device 38 through the record line indicated as a result of the switching device 34 being initially located in the position shown. After a predetermined time delay, a second voltage analog signal from the camera 30 is fed directly to the comparator 40 when the switching device 34 is repositioned to its alternate position (not shown), with the result that channel A of the memory disc 38 plays back the recorded voltage analog signal. It will be understood by those skilled in the art that the simple switch shown schematically in reference to the device 34 is intended to represent an electronic switching device for accomplishing this switching function. As a result of the switching device 34 being moved to its alternate position, the voltage analog signal produced by the camera 30 is fed directly to the comparator 40, and the recorded information in channel A of the memory disc 38 is played back to the comparator 40, and both voltage analog signals are synchronized with respect to one another for permitting an electronic comparison to be made by the comparator 40.

Figure 2:
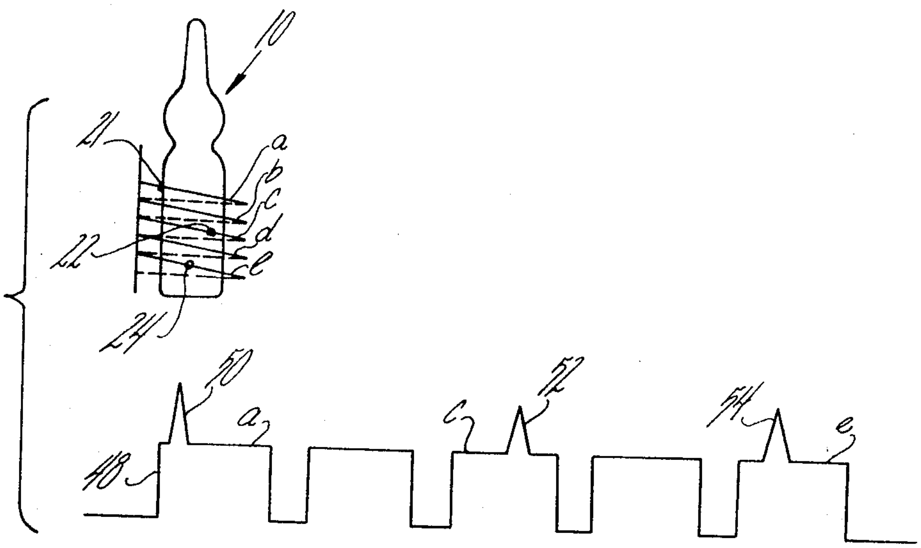
FIG. 2 is a schematic view showing graphically the results of a single scan of the ampul shown in FIG. 1.

Turning now to a more detailed description of the function served by the comparator 40, FIG. 2 shows an ampul 10 with the horizontal scans of the television camera 30 being indicated schematically at *a*, *b*, *c*, *d*, and *e*. For purposes of illustration, a glass defect is indicated generally at 21 on the external surface of the ampul 10 and foreign particles 22 and 24 are shown inside the ampul. In accordance with the present embodiment of the invention, wherein it is desired to detect the presence of foreign particles in a liquid contained in the article rather than defects existing on the surface of the article itself, the ampul 10 is first spun about its vertical axis by the mechanism described with reference to FIG. 1, and then its rotation is stopped with the result that the liquid contained therein continues to swirl carrying with it the particles 22 and 24 contained therein. As a result of this, the initial scan of the article 10 by the television camera 14 produces a voltage analog signal as represented schematically in FIG. 2. More particularly, the vertical synchronizing pulse 48 which initiates the frame representing this initial scan is provided to the camera through the synchronizing channel B of the memory device 38. The stationary defect, or dirt particle 21, on the surface of the glass will produce a pulse 50 in the horizontal scanline *a* as shown. The horizontal scanline *c* will produce a pulse 52 as a result of the presence of foreign particle 22, and the horizontal scanline *e* will produce a pulse 54 as a result of the foreign particle 24.

Figure 3:
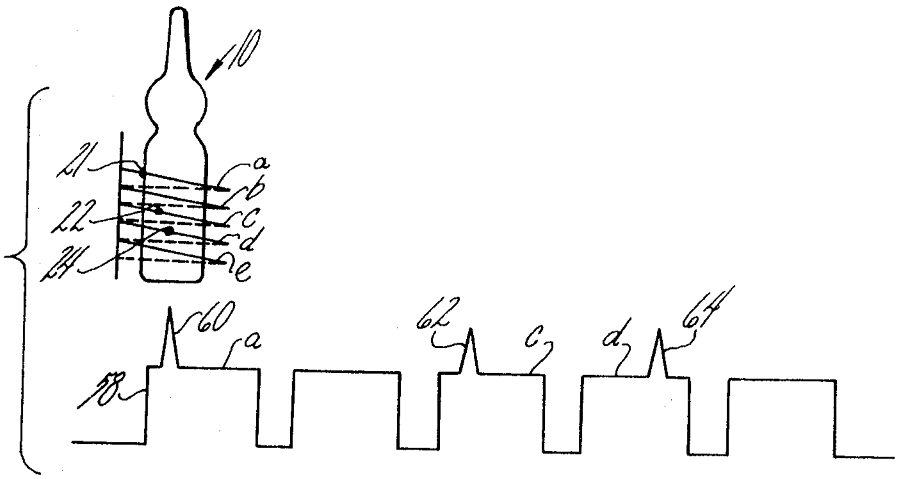
FIG. 3 is a view similar to FIG. 2 but showing graphically the same ampul shown in FIG. 2 at a slightly later instant of time.

As described hereinabove, and as indicated schematically in FIG. 3, the switching device 34 will operate after a predetermined time delay to take a second look at the ampul 10 producing a second voltage analog of the article at the inspection station, which second analog signal is synchronized with respect to the previous signal being fed to the comparator 40 in the manner described above. As shown in FIG. 3, a vertical synchronizing pulse 58 will be provided to initiate this frame of the camera through the synchronizing channel B of the memory device 38 and the stationary glass defect or particle 21 will appear as a pulse 60 located in the same relationship with respect to the vertical synchronizing pulse 58 as the previous pulse 50 with respect to the previous vertical synchronizing pulse 48. Here again, the pulse 60 occurs on the same scanline *a* on this frame of the camera. Quite by accident perhaps the foreign particle 22 is also detected on the same horizontal scanline *c* as indicated by the pulse 62. However, the foreign particle 24 has been moved by the swirling liquid to the scanline *d* as indicated by the pulse 64 in the example shown.

Figure 4:
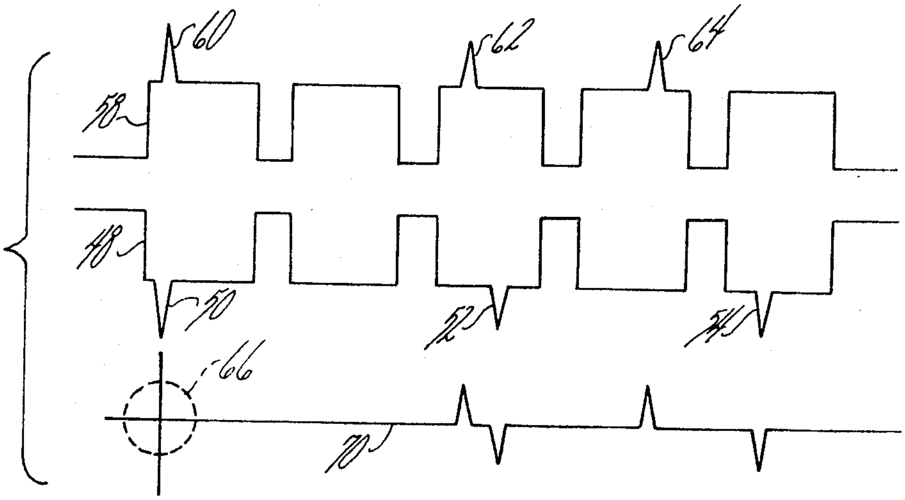
FIG. 4 shows the video analog signal of FIG. 2 in inverted position, and the results of adding said inverted signal to the analog signal shown in FIG. 3, with the sum of said signals being indicated graphically at the bottom of this view.

As previously mentioned, the voltage analog signals indicated generally in FIGS. 2 and 3 are simultaneously fed to the comparator 40, and as indicated schematically in FIG. 4, the first of these two signals is inverted on the same time base so as to be conveniently added to the second signal with the resultant signal being indicated generally at 70 in FIG. 4. It will be readily apparent that the pulses 50 and 60 produced by the stationary glass defect, or particle 21, will cancel one another as indicated generally at 66 in FIG. 4. However, the pulses 52 and 62 associated with the foreign particle 22 do not cancel one another but result in a positive and negative pulse combination which can be used to generate an error signal for operating a reject device 72 in order to remove that particular ampul 10 from other ampuls which do not contain such foreign particles. The pulses 54 and 64 created by particle 24 also produce a positive and negative pulse combination which can be used to generate an error signal. Depending upon the amplitude of the error signal so produced and also on its width, the system described herein can be used to reject ampuls containing particles which exceed some predetermined size.

We claim:

1. A method for inspecting articles wherein each of said articles comprise a transparent container containing a quantity of liquid, which liquid is to be inspected for the presence of foreign particles, said method comprising the steps of a. placing the article at an inspection station, b. scanning the article with a television camera to produce a voltage signal indicative of the image seen by said camera, c. storing said voltage signal in a memory device for subsequent use, d. moving the container so that the orientation of the liquid to be inspected is altered, e. scanning the article a second time with said television camera to produce a second voltage signal representing the second image seen by said camera, f. comparing said voltage signals to provide an error signal whenever said second voltage signal does not bear a predetermined relationship to said first voltage signal, and g. synchronizing said voltage signals with respect to one another, said step of comparing said synchronized voltage signals comprising a process of subtracting said first and second voltage signals from one another to produce said error signal when the difference exceeds a threshold value.

2. A system for inspecting a liquid filled transparent container which is to be inspected for the presence of foreign particles in the liquid, and comprising means for rotating the article momentarily so that the liquid is allowed to swirl while the article is held at an inspection station, a television camera for viewing said article, means for causing said camera to generate successive voltage signals indicative of said article images, a memory device for storing at least one such voltage signal, switching means causing said stored voltage signal to be recalled in timed relationship with a succeeding voltage signal, a comparator for combining said recalled voltage with said succeeding voltage and for generating an error signal whenever said signals do not bear a predetermined relationship to one another and, means for synchronizing said camera with said memory device so that said voltage signals are fed to said comparator in accurately indexed relationship to one another.

3. The system according to claim 2 and further including a light source so arranged adjacent one end of the container as to illuminate the particles.

4. The system according to claim 3 wherein said comparator subtracts said voltage signals from one another to provide said error signal, and a reject device operable in response to said error signal to separate a container with foreign particles from these containers without foreign particles.

5. A method for inspecting transparent containers for the presence of foreign particles in a liquid contained therein, said method comprising the steps of a. spinning the container so that the liquid contents are swirled therein, b. scanning the container and its contents with a television camera to produce a voltage signal indicative of the image seen by said camera, c. storing said voltage signal in a memory device, d. scanning the container and its contents a second time to produce a second voltage signal representing the second image seen by said camera, and e. recalling the stored voltage signal to compare it with said second voltage signal.

6. The method according to claim 5 and further characterized by the steps of a. synchronizing said voltage signals with respect to one another, b. comparing said voltage signals to provide an error signal whenever said second voltage signal does not bear a predetermined relationship to said first voltage signal.

7. The method according to claim 6 and further characterized by the additional step of stopping the rotation of said spinning container prior to the scanning steps so that only the liquid contained therein continues to move between said scanning steps, said step of comparing said synchronized voltage signals comprising a process of subtracting said first and second voltage signals from one another to produce an error signal which is not effected by stationary particles on the container and not effected by defects in said transparent containers.

8. The method according to claim 6 and further characterized by rejecting said container when the amplitude of said error signal exceeds a threshold value.

9. The method according to claim 6 and further characterized by rejecting said container when the time base width of said error signal exceeds a length corresponding to a predetermined particle size.

10. A method for inspecting articles comprising the steps of a. placing the article at an inspection station, b. scanning the article with a television camera to produce an electric signal which varies in accordance with the image seen by said camera, c. storing said signal in a memory device for subsequent use, d. rotating the article so that the orientation of the inspection portion with respect to the camera is altered, e. stopping rotation of the article to cause swirling of the liquid, f. scanning the article a second time with said camera to produce a second electric signal, g. synchronizing said signals with respect to one another, and h. comparing said signals to provide an error signal whenever said first and second signals do not bear a predetermined relationship to one another.

11. The method according to claim 10 wherein said step of comparing said first and second signals comprises a process of subtracting one from the other to produce said error signal in response to moving particles in the swirling liquid, said error signal being uneffected by stationary particles on the container and uneffected by optical defects in the transparent container.

12. The method according to claim 10 and further characterized by the additional step of illuminating the container from a light source so that the liquid provides a relatively dark background against which the particles stand out for a better contrast in the field of view of the camera.

13. A system for inspecting liquid filled transparent containers for the presence of foreign particles in the liquid, said system comprising a. means for supporting an article at an inspection station, b. means for rotating the article on its longitudinal axis, said means for rotating the container being carried out long enough to impart a swirling motion to the liquid and to any foreign particles therein, said article being held stationary at least momentarily, c. a television camera for generating successive video frames, each of said frames includes a pattern of electrical signals which vary in accordance with the successive images seen by said camera, d. a memory device for storing at least one such pattern of electrical signals, e. synchronizing means for said stored signals, f. and a comparator for combining said stored signals with a current video frame to generate an error signal whenever said compared patterns of electrical signals do not bear a predetermined relationship to one another, said comparator being effective to subtract said pattern of electrical signals from one another to generate said error signal.

14. The system according to claim 13 further characterized by a reject device operable in response to said error signal to separate a container with foreign particles from those without foreign particles.

15. The system according to claim 13 further characterized by a light source adjacent one end of the container at said inspection station for illuminating the particles in the liquid filled container.